No. 894,750.

PATENTED JULY 28, 1908.

J. SLEE.
ROAD VEHICLE WHEEL.
APPLICATION FILED MAR. 18, 1907.

3 SHEETS—SHEET 1.

Witnesses

Inventor
John Slee

No. 894,750. PATENTED JULY 28, 1908.
J. SLEE.
ROAD VEHICLE WHEEL.
APPLICATION FILED MAR. 18, 1907.

3 SHEETS—SHEET 2.

Witnesses
Inventor
John Slee
By Mason, Fenwick & Lawrence.
Attys

No. 894,750. PATENTED JULY 28, 1908.
J. SLEE.
ROAD VEHICLE WHEEL.
APPLICATION FILED MAR. 18, 1907.

3 SHEETS—SHEET 3.

Witnesses
J. M. Fowler Jr.
G. D. Thomas

Inventor
John Slee
By Mason, Fenwick & Lawrence
Attys.

UNITED STATES PATENT OFFICE.

JOHN SLEE, OF EARLSTOWN, NEWTON-LE-WILLOWS, ENGLAND.

ROAD-VEHICLE WHEEL.

No. 894,750.  Specification of Letters Patent.  Patented July 28, 1908.

Application filed March 18, 1907. Serial No. 362,985.

*To all whom it may concern:*

Be it known that I, JOHN SLEE, a subject of the King of Great Britain, residing in Earlstown, Newton-le-Willows, in the county of Lancaster, in the Kingdom of England, engineer, have invented certain new and useful Improvements in Road-Vehicle Wheels, for which application has been made in Great Britain, No. 26,316, dated November 20, 1906.

This invention has for its object to provide a resilient tire for road vehicle wheels, which will avoid the disadvantages of air inflated tires, and yet provide a resilience which is practically equal to a pneumatic tire.

Figure 1:
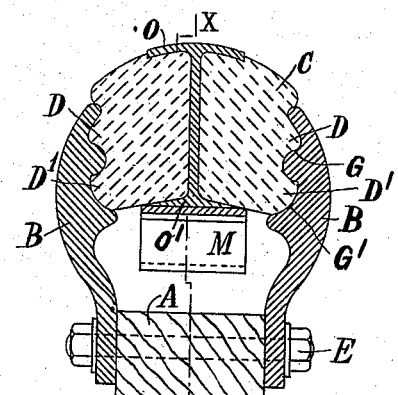
Figure 2:
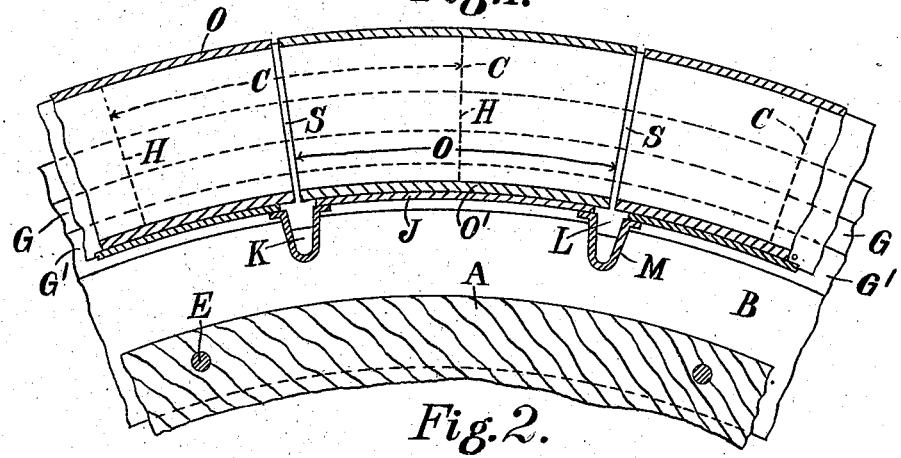
Figure 3:
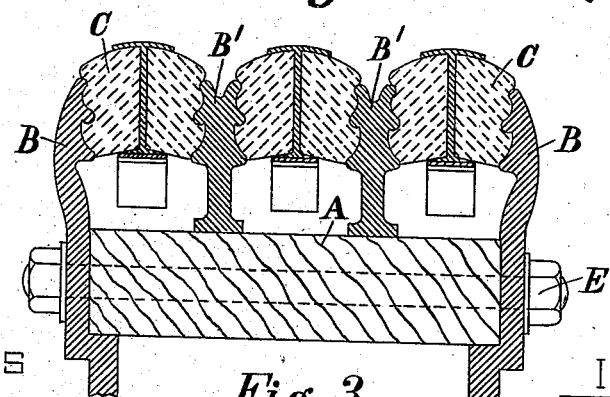
Figures 4, 9:
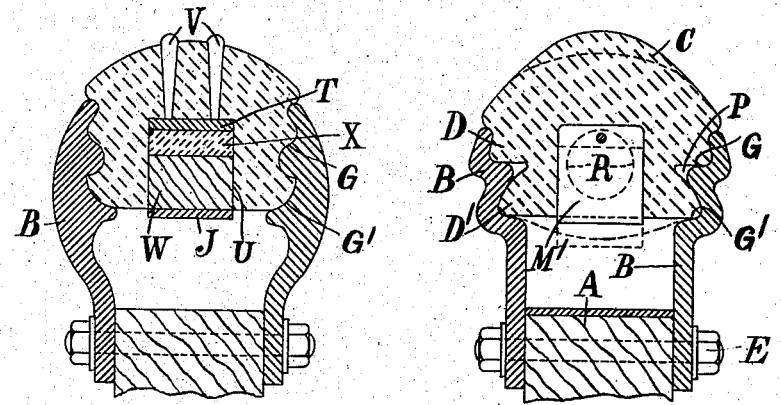
Figure 5:
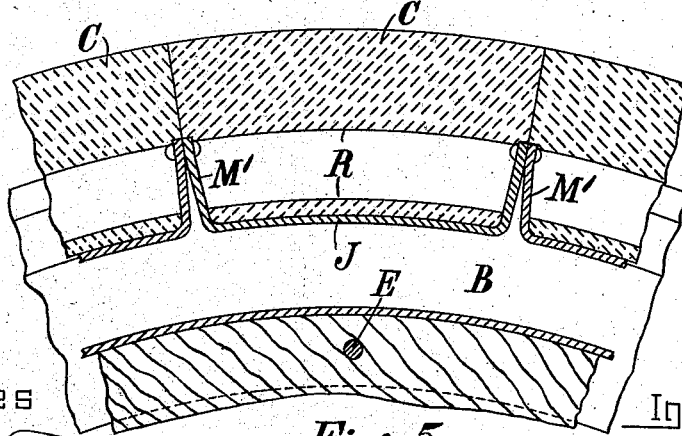
Figure 6:
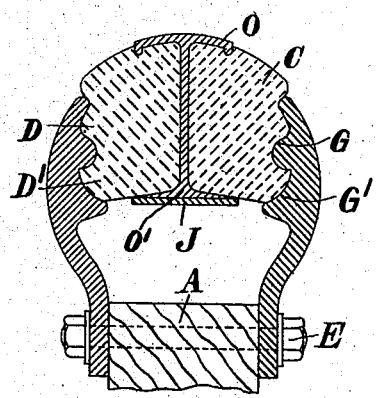

In the accompanying drawings, Figure 1 is a cross section of my tire; Fig. 2 a longitudinal section on the line X—Y of Fig. 1; Fig. 3 a cross section of my tire adapted for heavy vehicles; Fig. 4 a cross section, and Fig. 5 a longitudinal section of my tire with the flanges of the floating ring turned outward instead of inward; Fig. 6 a cross section, Fig. 7 a longitudinal section, and Fig. 8 a plan of my metal treaded or studded tire; Fig. 9 a cross section; and, Fig. 10 a longitudinal section of my tire fitted with metallic studs.

Referring to these figures, the rim A of the wheel has bolted to it, rings B, at each side. The tire C is of rubber, guttapercha, or other compressible material made in segments, and each side of the tire is formed with two or more lips D D'. The opposing faces of the rings B are correspondingly formed with abutments G G' to receive these lips D in the tire C, and the rings can be closed nearer together at will, by passing bolts E transversely through the rings B and rim A, so as to bring a side compression on each side of the tire C giving greater or less resiliency to the rubber. Thus the tire C is held in engagement with the rings B. The tire C is practically an arch, or the equivalent of an arch in so far as it is supported by the abutments G G' in the rings B at each side. The tire is made with a complete ring of metal cradles or shoes J, whose ends are bolted or riveted together with a small space K between the abutting ends, to form what I term a floating ring, that is a ring capable of resilience, as described in the specification of my application for Patent Serial No. 340,164, filed October 23, 1906. The rubber tire C is made to engage the floating ring either by a transverse rib L engaging the U shaped joint pieces M of the floating ring Fig. 2, or by the flanges M' of the floating ring engaging in depressions in the tire C as in Figs. 5 and 10.

The mode of action is as follows: The two annular rings B are put on, one on each side of the tire C, so that the abutments G G' will engage with the lips D D' on the tire and the bolts E are passed transversely through the rim A and rings B and fastened by nuts on the outside. In its normal condition, the rubber of the tire is held in compression by the side rings B, that bind it to the rim, and with the tire and rim concentric. As the wheel turns round, and the load comes upon the tire C, the tread is depressed, as shown by the dotted lines (Fig. 4), the load coming upon the abutments G while the overplus of the load is communicated down to the second pair of abutments G', (or a third pair if there be one). Furthermore the floating ring J being resilient, will yield under the weight of the load as shown also by the dotted lines (Fig. 4), and particularly when the tire strikes an obstruction or inequality in the road surface the force of the impact will compress this floating ring, or throw it out of concentricity with the rim. Therefore the force of the jar or shock of such impact, is to a great extent absorbed, the same as takes place with a pneumatic tire, but with this difference, that the whole tire by my invention, is for the moment thrown out of concentricity with the rim, and immediately the obstruction is passed the tire resumes its concentricity, also the whole weight of the load is distributed over the tire. With a tire constructed without the floating ring J, it is only the part that is actually touching the ground at the moment of impact that is compressed or forced inwards, and consequently the elasticity of one part only is utilized at a time. By the addition of the floating ring, however, the whole tire absorbs the jar. P are annular depressions (Fig. 4) between the lips D D' in the sides of the tire which are deeper than the abutments G on the rings B, so as to leave a space between the two. This facilitates the free action of the tire C and secures greater resilience. The stress from the wheel to the tire is communicated through the contact or grip between the flanges B and the tire C and also by means of the transverse bolts E. The tire in Figs. 4 and 5 has a hole R through it, to tighten the rubber and make it more elastic. Two, three or more tires can be placed side by side for heavy vehicles as shown in Fig. 3. In this case intermediate flanges B' are placed between each tire, and by tightening up the bolts E, a side compression is put upon the tires by means of the side flanges B.

Figure 7:
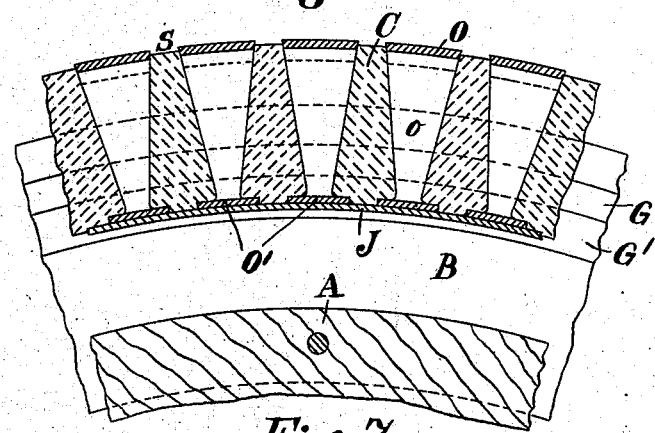
Figure 8:
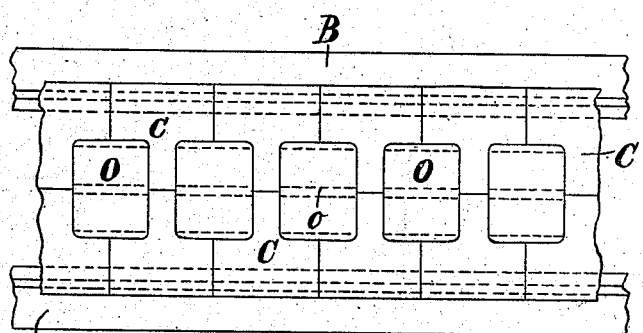

For heavy tires, I divide each segment of the tire C longitudinally into two pieces, and between the abutting faces I place a rail O or girder pieces of T section, so arranged that the head O shall form the tread of the tire, and the other head O' will lie on the internal periphery of the tire, C, either flush therewith or projecting. The load comes upon the head of the rail O, and is communicated through the head, to the rubber C and so to the side abutments G G'. The head of the rail therefore takes all the wear and tear, and yet I get the advantage of great resilience from the rubber. The rail O in Fig. 2 is made in short lengths, with a small space S between the adjacent ends, and the adjacent ends H of the rubber segments C, are preferably midway between alternate ends S. Or the girder O can be made as shown in Figs. 6, 7 and 8, and these lengths do not actually abut but are a short distance apart so as to have the appearance of a series of rectangular heads or studs O projecting from the tire C. In this case it is best to make a tapering rectangular cavity to receive the webs o of the girder O, the webs o being made taper to correspond, and the heads O overlapping the rubber C a little at the two edges. The other head O' lies on the internal periphery of the tire.

Figure 10:
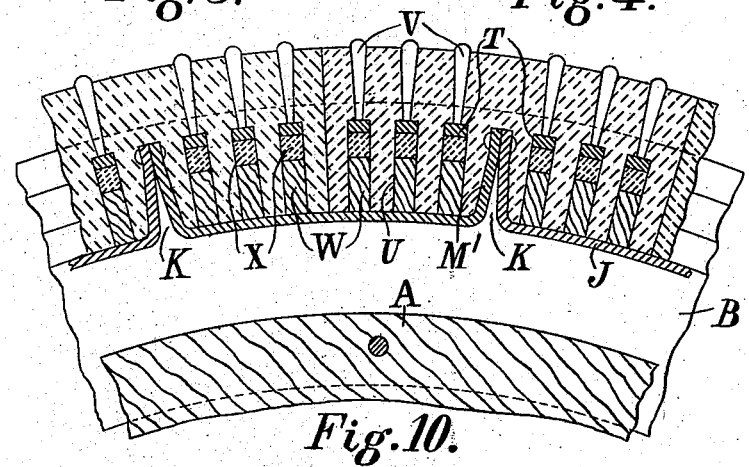

In Figs. 9 and 10 the studs are made in the form of pins V attached to a base plate T. A cavity U is made in the tire and into this the base plate T is inserted with the pins V projecting through holes in the rubber C. Interposed between each base plate T and the floating ring J are wood blocks W and the rubber blocks X. This arrangement enables the studs to give a little should they meet any hard obstruction in the road.

I declare that what I claim is:—

1. In a wheel, the combination with the felly, of a retaining ring on each side of and projecting beyond the felly, segments of compressible material between the rings and free to expand inwardly toward the felly and bolts passing through the felly and rings to cause the rings to laterally compress the segments, the inner faces of the rings which bear upon the segments being annularly grooved.

2. In a wheel, the combination of the felly, two rings bolted to and projecting beyond the felly, segments of compressible material clamped between the rings and free to expand inwardly toward the felly, the sides of the tire rigidly supported by contact with the inner surface of the rings, and fillers interposed between the segments and provided with heads which form the tread of the tire.

3. In a wheel, the combination of the felly, two rings bolted to and projecting beyond the felly, segments of compressible material clamped between the rings a floating ring between the segments and the felly and fillers between the segments having outer heads which form the tread of the tire and inner heads inside of the segments.

4. In a wheel, the combination of the felly, two rings bolted to and projecting beyond the felly, a plurality of segments of compressible material free to expand inwardly toward the felly and located between the rings, and separating flanges between adjacent segments, the abutting surfaces of the rings, separating flanges and segments being provided with corresponding annular grooves and projections.

5. In a wheel, the combination of the felly, two rings bolted to and projecting beyond the felly, segments of compressible material clamped between the rings and a floating ring inside of the segments.

6. In a wheel the combination of segments of compressible material, retaining rings therefor and a resilient ring upon which the tire segments rest, the abutting surfaces of the segments and retaining rings having corresponding annular depressions and projections.

In witness whereof, I have hereunto signed my name this 26th day of February 1907, in the presence of two subscribing witnesses.

JOHN SLEE.

Witnesses:
G. C. DYMOND,
JOHN McLACHLAN.